United States Patent
Sloo

(10) Patent No.: US 8,458,606 B2
(45) Date of Patent: Jun. 4, 2013

(54) DISPLAYING RELATEDNESS OF MEDIA ITEMS

(75) Inventor: David H. Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 11/640,728

(22) Filed: Dec. 18, 2006

(65) Prior Publication Data

US 2008/0148179 A1    Jun. 19, 2008

(51) Int. Cl.
*G06F 3/048* (2006.01)
(52) U.S. Cl.
USPC ........... 715/764; 715/810; 715/825; 715/817; 715/845; 715/834; 715/829
(58) Field of Classification Search
USPC ................. 715/764, 810, 818, 819, 820, 825, 715/817, 845, 834, 829; 705/26; 345/811
See application file for complete search history.

(56) References Cited

U.S. PATENT DOCUMENTS

| | | | |
|---|---|---|---|
| 5,617,120 A * | 4/1997 | Kaneko | 345/619 |
| 5,912,668 A * | 6/1999 | Sciammarella et al. | 715/788 |
| 5,918,223 A | 6/1999 | Blum et al. | |
| 6,012,053 A * | 1/2000 | Pant et al. | 1/1 |
| 6,064,980 A * | 5/2000 | Jacobi et al. | 705/26 |
| 6,243,713 B1 | 6/2001 | Nelson et al. | |
| 6,408,293 B1 | 6/2002 | Aggarwal et al. | |
| 6,523,048 B2 * | 2/2003 | DeStefano | 715/234 |
| 6,675,174 B1 | 1/2004 | Bolle et al. | |
| 6,792,434 B2 | 9/2004 | Moghaddam et al. | |
| 6,877,002 B2 | 4/2005 | Prince | |
| 6,889,250 B2 * | 5/2005 | Bezos et al. | 709/218 |
| 7,031,980 B2 | 4/2006 | Logan et al. | |
| 7,068,723 B2 | 6/2006 | Foote et al. | |
| 7,124,129 B2 * | 10/2006 | Bowman et al. | 1/1 |
| 7,194,454 B2 * | 3/2007 | Hansen et al. | 1/1 |
| 7,412,442 B1 * | 8/2008 | Vadon et al. | 707/5 |
| 7,433,832 B1 * | 10/2008 | Bezos et al. | 705/26 |
| 7,542,951 B1 * | 6/2009 | Chakrabarti et al. | 706/45 |
| 2002/0191030 A1 * | 12/2002 | Trajkovic et al. | 345/811 |
| 2002/0198882 A1 * | 12/2002 | Linden et al. | 707/10 |
| 2004/0054572 A1 * | 3/2004 | Oldale et al. | 705/10 |
| 2004/0133571 A1 * | 7/2004 | Horne et al. | 707/3 |

(Continued)

OTHER PUBLICATIONS

Aigrain et al., "Content-based Representation and Retrieval of Visual Media: A State-of-the-Art Review",http://citeseer.ist.psu.edu/cache/papers/cs/5741/ftp:zSzzSzftp.irit.frzSzpubzSzIRITzSzAMIzSz MTAP.pdf/aigrain96contentbased.pdf.
Candan et al., "Similarity-based Ranking and Query Processing in Multimedia Databases", http://www.public.asu.edu/~candan/pubs/dke00.ps.

(Continued)

*Primary Examiner* — Andrey Belousov
*Assistant Examiner* — Erik Stitt

(57) ABSTRACT

In a method in a computer system for displaying on a display device a plurality of media items as selectable media tiles, a focus media item and a plurality of related media items are received. The plurality of related media items are related to the focus media item. Relatedness information pertaining to the plurality of related media items is received. The relatedness information identifies a relationship strength between at least one of the plurality of related media items and the focus media item. A spatially oriented relatedness arrangement of selectable media tiles physically positioned to indicate said relationship strength between the focus media item and the at least one of the plurality of related media items is displayed on the display device. The selectable media tiles represent the focus media item and at least one of the plurality of related media items.

20 Claims, 15 Drawing Sheets

U.S. PATENT DOCUMENTS

| | | | |
|---|---|---|---|
| 2005/0071251 A1* | 3/2005 | Linden et al. | 705/26 |
| 2005/0203888 A1* | 9/2005 | Woosley et al. | 707/3 |
| 2006/0026127 A1 | 2/2006 | Bodlaender | |
| 2006/0080356 A1 | 4/2006 | Burges et al. | |
| 2006/0184558 A1 | 8/2006 | Martin et al. | |
| 2006/0288000 A1* | 12/2006 | Gupta | 707/5 |
| 2008/0028308 A1* | 1/2008 | Brownlee et al. | 715/275 |

OTHER PUBLICATIONS

Flickner et al., "Query by Image The QBIC System", Date: Sep. 1995, http://www.cs.virginia.edu/~son/cs662.s06/QBIC.pdf#search=%22%22Query%20by%20Image%20and%20Video%20Content%22%22.

* cited by examiner

300

RECEIVING A FOCUS MEDIA ITEM AND A PLURALITY OF RELATED MEDIA ITEMS, THE PLURALITY OF RELATED MEDIA ITEMS BEING RELATED TO THE FOCUS MEDIA ITEM.
310

RECEIVING RELATEDNESS INFORMATION PERTAINING TO THE PLURALITY OF RELATED MEDIA ITEMS, THE RELATEDNESS INFORMATION IDENTIFYING A RELATIONSHIP STRENGTH BETWEEN AT LEAST ONE OF THE PLURALITY OF RELATED MEDIA ITEMS AND THE FOCUS MEDIA ITEM.
320

DISPLAYING ON THE DISPLAY DEVICE A SPATIALLY ORIENTED RELATEDNESS ARRANGEMENT OF SELECTABLE MEDIA TILES PHYSICALLY POSITIONED TO INDICATE THE RELATIONSHIP STRENGTH BETWEEN THE FOCUS MEDIA ITEM AND THE AT LEAST ONE OF THE PLURALITY OF RELATED MEDIA ITEMS, THE SELECTABLE MEDIA TILES REPRESENTING THE FOCUS MEDIA ITEM AND AT LEAST ONE OF THE PLURALITY OF RELATED MEDIA ITEMS.
330

FIG. 3

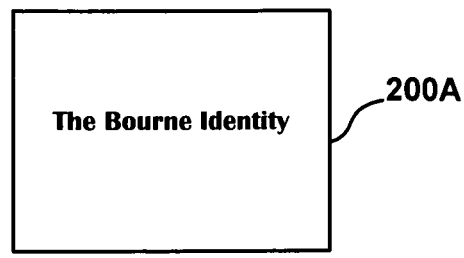
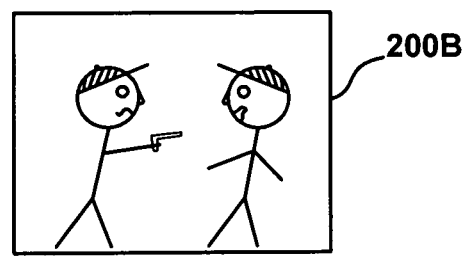
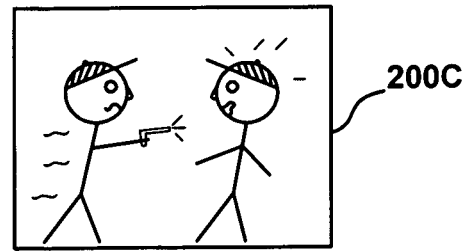
FIG. 5

1100

RECEIVING A PLURALITY OF MEDIA TILES REPRESENTING A FOCUS MEDIA ITEM AND A PLURALITY OF RELATED MEDIA ITEMS RELATED TO THE FOCUS MEDIA ITEM.
1110

RECEIVING RELATEDNESS INFORMATION PERTAINING TO AT LEAST ONE OF THE PLURALITY OF RELATED MEDIA ITEMS.
1120

UTILIZING THE RELATEDNESS INFORMATION FOR PHYSICALLY POSITIONING THE PLURALITY OF MEDIA TILES ON THE DISPLAY DEVICE SUCH THAT THE PHYSICAL POSITIONING PROVIDES A REPRESENTATION OF RELATEDNESS BETWEEN THE FOCUS MEDIA ITEM AND AT LEAST ONE OF THE PLURALITY OF RELATED MEDIA ITEMS.
1130

RECEIVING A SELECTION SIGNAL INDICATIVE OF A USER SELECTING A MEDIA ITEM ASSOCIATED WITH A MEDIA TILE DISPLAYED ON THE DISPLAY DEVICE, AND, IN RESPONSE TO THE SELECTION SIGNAL, REVISING THE PHYSICAL POSITIONING TO PROVIDE A REPRESENTATION OF RELATEDNESS BETWEEN THE SELECTED MEDIA ITEM AND A SECOND PLURALITY OF RELATED MEDIA ITEMS RELATED TO THE SELECTED MEDIA ITEM.
1140

RECEIVING A FOCUS MEDIA ITEM AND A PLURALITY OF RELATED MEDIA ITEMS, THE PLURALITY OF RELATED MEDIA ITEMS BEING RELATED TO THE FOCUS MEDIA ITEM.
1210

RECEIVING RELATEDNESS INFORMATION PERTAINING TO AT LEAST ONE OF THE PLURALITY OF RELATED MEDIA ITEMS.
1220

DISPLAYING THE FOCUS MEDIA ITEM AND AT LEAST ONE OF THE RELATED MEDIA ITEMS ON A DISPLAY DEVICE SUCH THAT A PHYSICAL POSITIONING OF THE FOCUS MEDIA ITEM RELATIVE TO THE AT LEAST ONE RELATED MEDIA ITEM PROVIDES A REPRESENTATION OF THE RELATEDNESS INFORMATION.
1230

FIG. 12

DISPLAYING RELATEDNESS OF MEDIA ITEMS

BACKGROUND

Modern computing has allowed individuals to access vast amounts of data. In fact, the vastness of the data is such that is often difficult for users of the internet, computer systems, media centers, and the like to present or display data such that they can easily grasp relationships that may exist in the displayed data. This has led to the use of search engines and more specifically recommendation engines to help users sort through available data.

For example, presently there exist a variety of recommendation services and engines, which allow a user to express interest in a media item, such as a song, movie, television show, videogame, or the like. The recommendation service or engine takes this focus media item of interest as an input and then returns a group of related media items which have been determined in some fashion to be related to the focus media item that the user has expressed interest in. This group of related media items is typically displayed on a display device along with the focus media item in some fashion such as via a vertical listing.

In such a display, related items may or may not be displayed by order of relatedness to the focus media item, and may or may not display alphanumeric metadata indicating a level of relatedness to the focus media item. This leaves the user to manually sort through each result and somehow interpret its relatedness to the focus media item, either by viewing each displayed item and assigning a personal relevance to it, it or by interpreting displayed alphanumeric relatedness metadata. Such displays of a focus media item and related media items can be confusing and require a user to spend a considerable amount of time interpreting displayed information. This can frustrate a user's experience with a computing device, media device, or a recommendation engine.

Thus, a display of related media items which addresses some of the above disadvantages would be advantageous.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for displaying relatedness of media items is disclosed. The technology represents methods and user interfaces for displaying, and in some instances selecting from, a plurality of media items displayed on a display device. A focus media item and a plurality of related media items are received, such as from a recommendation engine. The plurality of related media items are related to the focus media item in some fashion. Relatedness information pertaining to the plurality of related media items is received, such as in metadata which accompanies one or more of the received related media items. The relatedness information identifies a relationship strength between at least one of the plurality of related media items and the focus media item.

A spatially oriented relatedness arrangement which represents the media items is then displayed. This can comprise using selectable media tiles physically positioned to indicate said relationship strength between the focus media item and the at least one of the plurality of related media items is displayed on the display device. The selectable media tiles represent the focus media item and at least one of the plurality of related media items. A linear spiral array, which represents a focus media item at the center of the spiral, is one example of such a display. This allows a user to easily grasp relatedness between one or more displayed items. In some instances, a representation of a displayed media item may be selected, thus causing the display to be revised to show a second plurality of media items that are related to the selected item. The new display shows relationship strengths between the selected media item and one or more the second plurality of media items.

DESCRIPTION OF THE DRAWINGS

The accompanying drawings, which are incorporated in and form a part of this specification, illustrate embodiments of the technology for displaying relatedness of media items and, together with the description, serve to explain principles discussed below:

FIG. 3 is a flow diagram of operations performed in accordance with one embodiment of the present technology.

FIG. 5 shows examples of media tiles, according to various embodiments of the present technology.

FIG. 11 is a flow diagram of operations performed in accordance with one embodiment of the present technology.

FIG. 12 is a flow diagram of operations performed in accordance with one embodiment of the present technology.

The drawings referred to in this description should be understood as not being drawn to scale except if specifically noted.

DETAILED DESCRIPTION

Reference will now be made in detail to embodiments of the present technology for displaying relatedness of media items, examples of which are illustrated in the accompanying drawings. While the technology for displaying relatedness of media items will be described in conjunction with various embodiments, it will be understood that they are not intended to limit the present technology for displaying relatedness of media items to these embodiments. On the contrary, the presented technology for displaying relatedness of media items is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for displaying relatedness of media items. However, the present technology for displaying relatedness of media items may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "displaying", "utilizing", "arranging", "positioning", "selecting", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for displaying relatedness of media items is also well suited to the use of other computer systems such as, for example, optical and virtual computers. Additionally, it should be understood that in embodiments of the present technology for displaying relatedness of media items, one or more of the steps can be performed manually.

Example Computer System Environment

Figure 1:
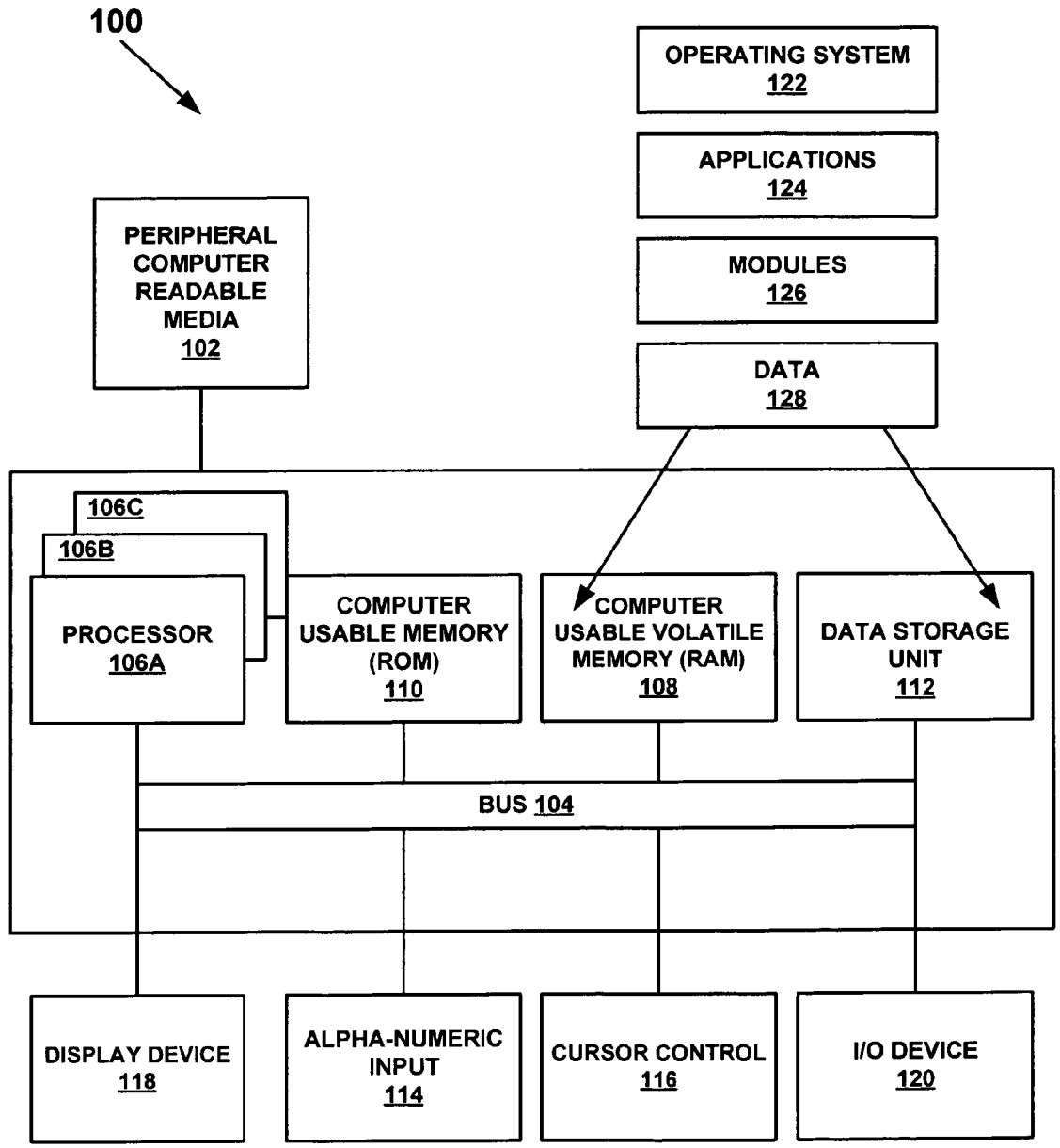
FIG. 1 is a diagram of an example computer system used in accordance with embodiments of the present technology for displaying relatedness of media items.

With reference now to FIG. 1, portions of the technology for displaying relatedness of media items are composed of computer-readable and computer-executable instructions that reside, for example, in computer-usable media of a computer system. That is, FIG. 1 illustrates one example of a type of computer that can be used to implement embodiments, which are discussed below, of the present technology for displaying relatedness of media items. FIG. 1 illustrates an example computer system 100 used in accordance with embodiments of the present technology for displaying relatedness of media items. It is appreciated that system 100 of FIG. 1 is only an example and that the present technology for displaying relatedness of media items can operate on or within a number of different computer systems including general purpose networked computer systems, embedded computer systems, routers, switches, server devices, client devices, various intermediate devices/nodes, stand alone computer systems, media centers, handheld devices, televisions, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C: Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for displaying relatedness of media items, for example, is stored as an application 124 or module 126 in memory locations within RAM 108 and media within data storage unit 112.

Overview

Figure 2:
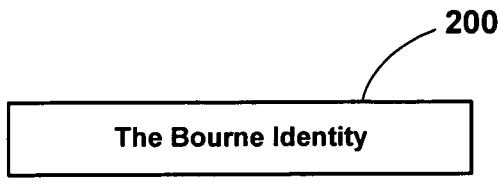
FIG. 2 shows an example focus media item according to one embodiment of the present technology.

Referring now to FIG. 2, FIG. 2 shows an example focus media item 200 according to one embodiment of the present technology. Focus media item 200, as shown, is a movie in which a user has expressed interest. It is appreciated that embodiments described herein may be used with a wide variety of media items, such as movies, television shows, songs, books, and the like. However, for purposes of example and not of limitation, examples of media items (focus media items and related media items) herein will be movies. It is appreciated that a focus media item (and related media items described below) may comprise all or part of the content of a media item, such as textual information and still or moving images.

According to one embodiment, a recommendation engine receives focus media item 200 as an indication of a user's interest in a targeted media item and then determines a collection of media items that are similar to the focus media item 200. A wide variety of such recommendation engines (to include search engines, relevance algorithms, and the like) are well known in the art. For example, some such recommendation engines use techniques such as analyzing metadata about a focus media item to determine similarities to metadata of other media items. Additionally, some such recommendation engines incorporate or compile human comparisons or ratings of media items to determine relatedness of other media items to a focus media item such as focus media item 200.

As will be described herein, embodiments of the present technology, receive relatedness information from such a recommendation engine and then utilize this relatedness information to display the focus media item and related media items in a fashion that allows a user to easily grasp the relatedness of media items at a glance, without having to think about relatedness information in the form of rankings, relatedness scores, displayed or underlying alphanumeric relatedness metadata, or the like.

Example Methods of Operation

The following discussion sets forth in detail the operation of present technology for displaying relatedness of media items. With reference to FIGS. 3, 11, and 12, flow diagrams 300, 1100 and 1200 each illustrate example steps used by various embodiments of the present technology for displaying relatedness of media items. Flow diagrams 300, 1100 and 1200 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, peripheral computer-readable media 102, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 300, 1100 and 1200, such steps are examples. That is, embodiments are well suited to performing various other steps or variations of the steps recited in flow diagrams 300, 1100 and 1200. It is appreciated that the steps in flow diagrams 300, 1100 and 1200 may be performed in an order different than presented, and that not all of the steps in flow diagrams 300, 1100 and 1200 may be performed.

Displaying a Plurality of Media Items as Selectable Media Tiles

FIG. 3 is a flow diagram 300 of operations performed in accordance with one embodiment of the present technology for displaying relatedness of media items. More specifically, FIG. 3 illustrates a flow diagram 300 of an example embodiment of a method in computer system, such as computer system 100, for displaying on a display device, such as display device 118, a plurality of media items as selectable media tiles. Elements of flow diagram 300 are explained below, with reference to elements of FIG. 2, FIG. 4A, FIG. 4B, FIG. 5, FIG. 6A, FIG. 6B, FIG. 6C, FIG. 7, FIG. 8, FIG. 9, and FIG. 10.

At step 310 of flow diagram 300, the method receives a focus media item and a plurality of related media items. The plurality of related media items are related to the focus media item in some fashion. In one instance the focus media item and plurality of related media items are received from a recommendation engine. A focus media item and related media items may be movies, songs, television shows, books, or the like. As shown by FIG. 2, focus media item 200, a movie, is one example of a focus media item received at step 310. As shown by FIG. 3, related media items 405, which are also movies, are examples of related media items received in conjunction with focus media item 200. Thus in the example given, individual related media items 410, 420, 430, 440, 450, 460, 470, 480, 490 are movies which, for example, a recommendation engine or some other source has determined to be related in some fashion to focus media item 200.

At step 320 of flow diagram 300, the method receives relatedness information pertaining to the plurality of related media items. The relatedness information identifies a relationship strength between at least one of the plurality of related media items and the focus media item. This relatedness information may be received in the form of metadata supplied, for example, by a recommendation engine along with the plurality of related media items.

Figure 4A:
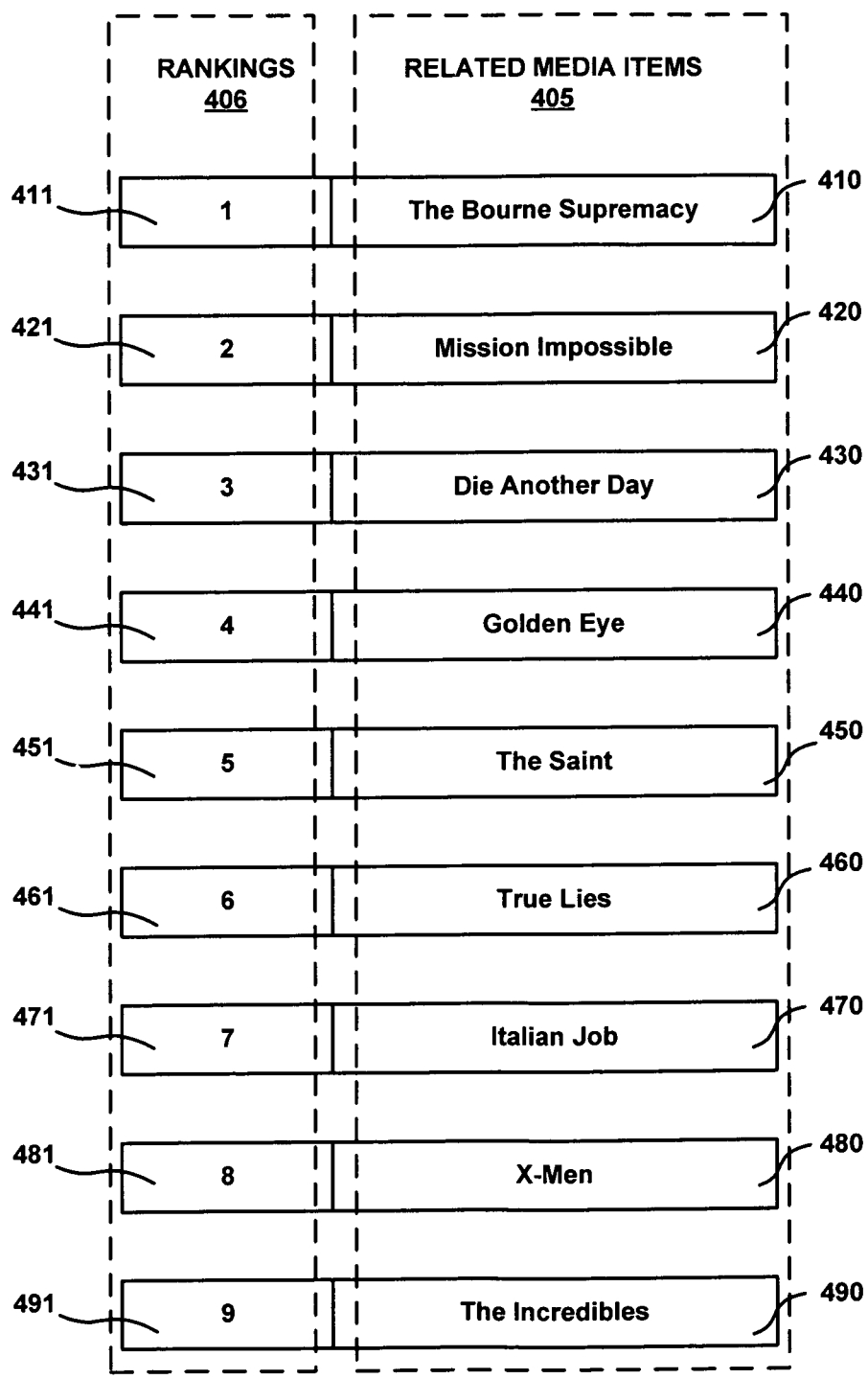
FIGS. 4A and 4B both show examples of related media items and relatedness information pertaining to the related media items, according to embodiments of the present technology.

In one embodiment, step 320 comprises receiving rank information wherein the rank information ranks one or more of the plurality of related media items in order of relatedness in comparison to the focus media item. FIG. 4A provides an example of such an embodiment. In FIG. 4A, relatedness rankings 406 are associated with related media items 405. Thus in FIG. 4A, related media item 410 has a ranking 411 of "1", indicating that the movie "The Bourne Supremacy" has been ranked as being most related to focus media item 200, which is the movie "The Bourne Identity". In descending order of relatedness, FIG. 4A shows that: related media item 410 has a ranking 411; related media item 420 has a ranking 421; related media item 430 has a ranking 431; related media item 440 has a ranking 441; related media item 450 has a ranking 451; related media item 460 has a ranking 461; related media item 470 has a ranking 471; related media item 480 has a ranking 481; and related media item 490 has a ranking 491. In one embodiment, these related media items 405 are received in hierarchical order according to relatedness rakings 406. In another embodiment, related media items 405 are received in some random order and are arranged in a linear array or list by hierarchical relatedness ranking 406, as shown in FIG. 4A.

Figure 4B:
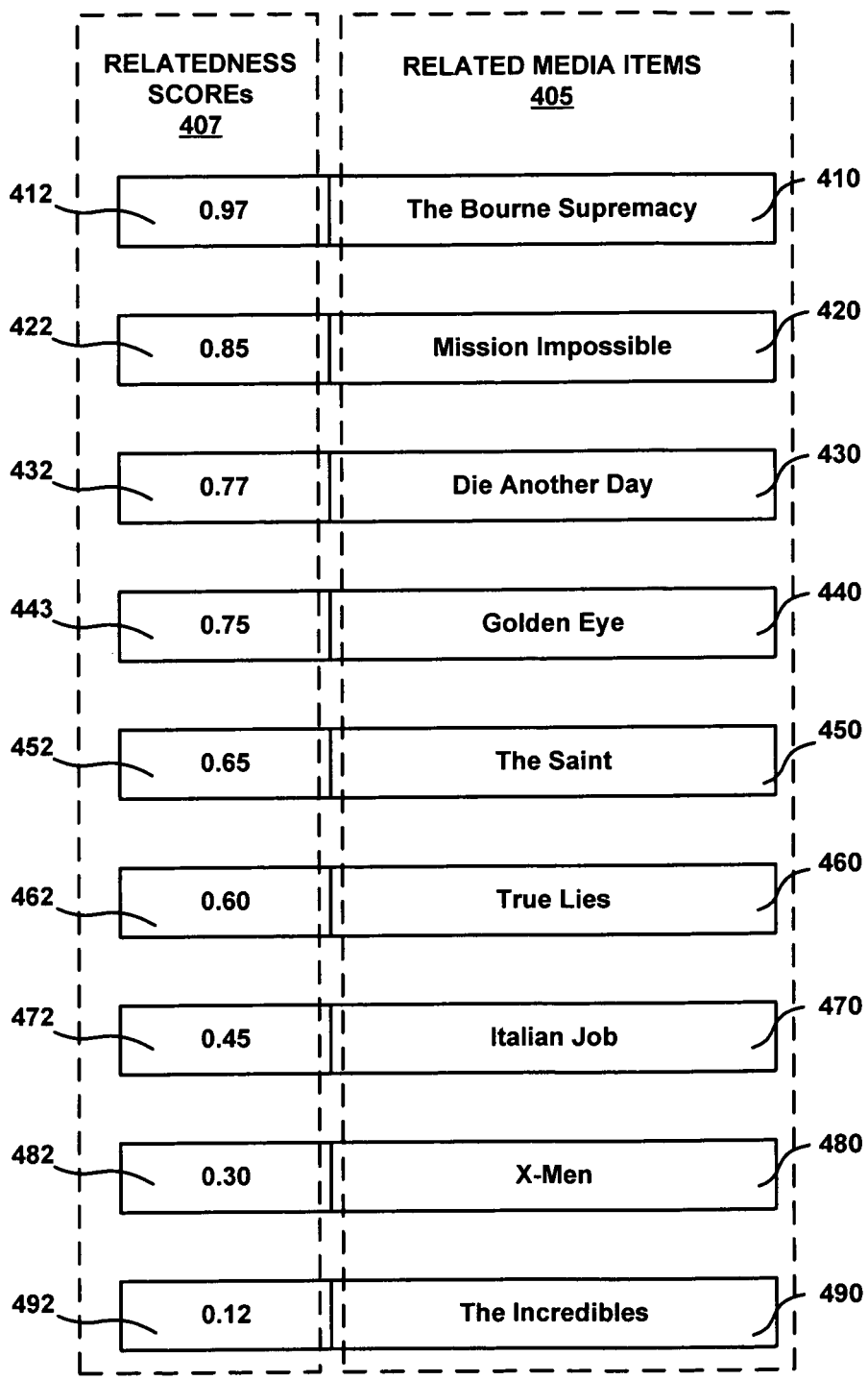

In one embodiment, step 320 comprises receiving relatedness score information wherein the relatedness score information indicates a level of relatedness of at least one of the plurality of related media items to the focus media item. FIG. 4B provides an example of such an embodiment. In FIG. 4B, relatedness scores 407 are associated with related media items 405. As shown in FIG. 4B, a maximum relatedness score is "1.0" and a minimum relatedness score is "0.0". Thus in FIG. 4B, related media item 410 has a has a relatedness score 412 of "0.97", indicating that the movie "The Bourne Supremacy" has been scored as being most related to focus media item 200, which is the movie "The Bourne Identity". In descending order of relatedness, FIG. 4B shows that: related media item 410 has a relatedness score 412; related media item 420 has a relatedness score 422; related media item 430 has a relatedness score 432; related media item 440 has a relatedness score 442; related media item 450 has a relatedness score 452; related media item 460 has a relatedness score 462; related media item 470 has a relatedness score 472; related media item 480 has a relatedness score 482; and related media item 490 has a relatedness score 492. In one embodiment, these related media items 405 are received in hierarchical order according to relatedness scores 407. In another embodiment, related media items 405 are received in some random order and are arranged in a linear array or list by hierarchical order of relatedness scores 407, as shown in FIG. 4B.

At step 330 of flow diagram 300, the method displays on display device 118 a spatially oriented relatedness arrangement of selectable media tiles physically positioned to indicate the relationship strength between the focus media item and at least one of the plurality of related media items. The selectable media tiles represent the focus media item and at least one of the plurality of related media items. As will be further described, the spatially oriented relatedness arrangement refers to the media tiles being physically oriented on display device 118 such that a user can easily grasp the relatedness of a focus media tile to one or more co-displayed related media tiles.

FIG. 5 shows three examples of media tiles (200A, 200B, and 200C), according to various embodiments of the present technology. A media tile as discussed herein is a selectable or non-selectable entity (similar to an icon) for displaying some combination of graphical and/or textual information associated with a media item such as, for example focus media item 200 or related media item 410. A selectable media tile is selectable in that it may be selected by a user, for instance with a user selection device such as cursor control device 116, in order to invoke some functionality associated with the media tile.

As will be seen, media tiles may be physically arranged for electronic display upon display device 118. In one embodiment, the graphical and/or textual information displayed in a media tile is received in the form of a readily displayable an media tile, while in another embodiment the graphical and or textual information displayed is received separately from and then incorporated into a media tile. Such graphical and or textual information, as described below, may be provided in conjunction with a media item (such as from a recommendation engine) or retrieved from some other source such as the internet or a media collection.

In FIG. 5, media tile 200A shows an example of a media tile which displays textual information associated with a media item. Media tile 200A provides textual information, such as a movie title, associated with media item 200. Such textual information may be still or moving, and in other embodiments may include other information besides the title of the associated media item.

In FIG. 5, media tile 200B shows an example of a media tile which displays graphical information in the form of a still image associated with a media item. Media tile 200B provides a still image associated with media item 200, such as an image from a poster, package covering, or a still image from the movie "The Bourne Identity". In other embodiments, a media tile such as 200B may show a still image from an album cover, an image of an entertainer associated with a media item, or some other still image associated with a particular media item.

In FIG. 5, media tile 200C shows an example of a media tile which displays graphical information in the form of a moving image associated with a media item. Media tile 200C provides a moving image associated with media item 200, such as a movie clip, an advertising trailer, or the like from the movie "The Bourne Identity". In other embodiments, a media tile such as 200C may show a moving image from, for example, a television show, a music video, or some other moving image associated with a media item.

Figure 6A:
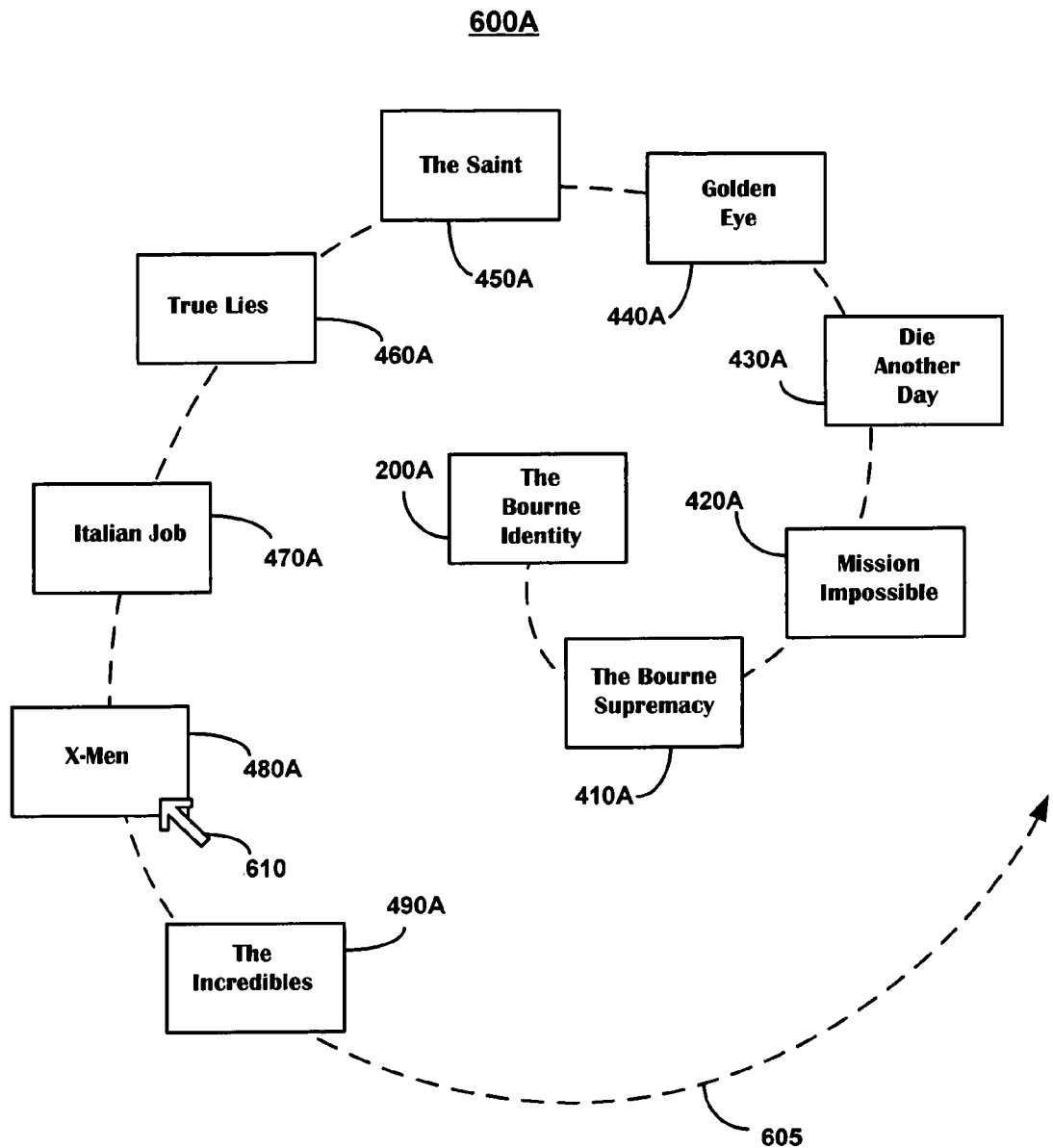
FIGS. 6A, 6B, and 6C are examples of spiral arrangements of a focus media item surrounded by related media items, according to various embodiments of the present technology.
Figure 6B:
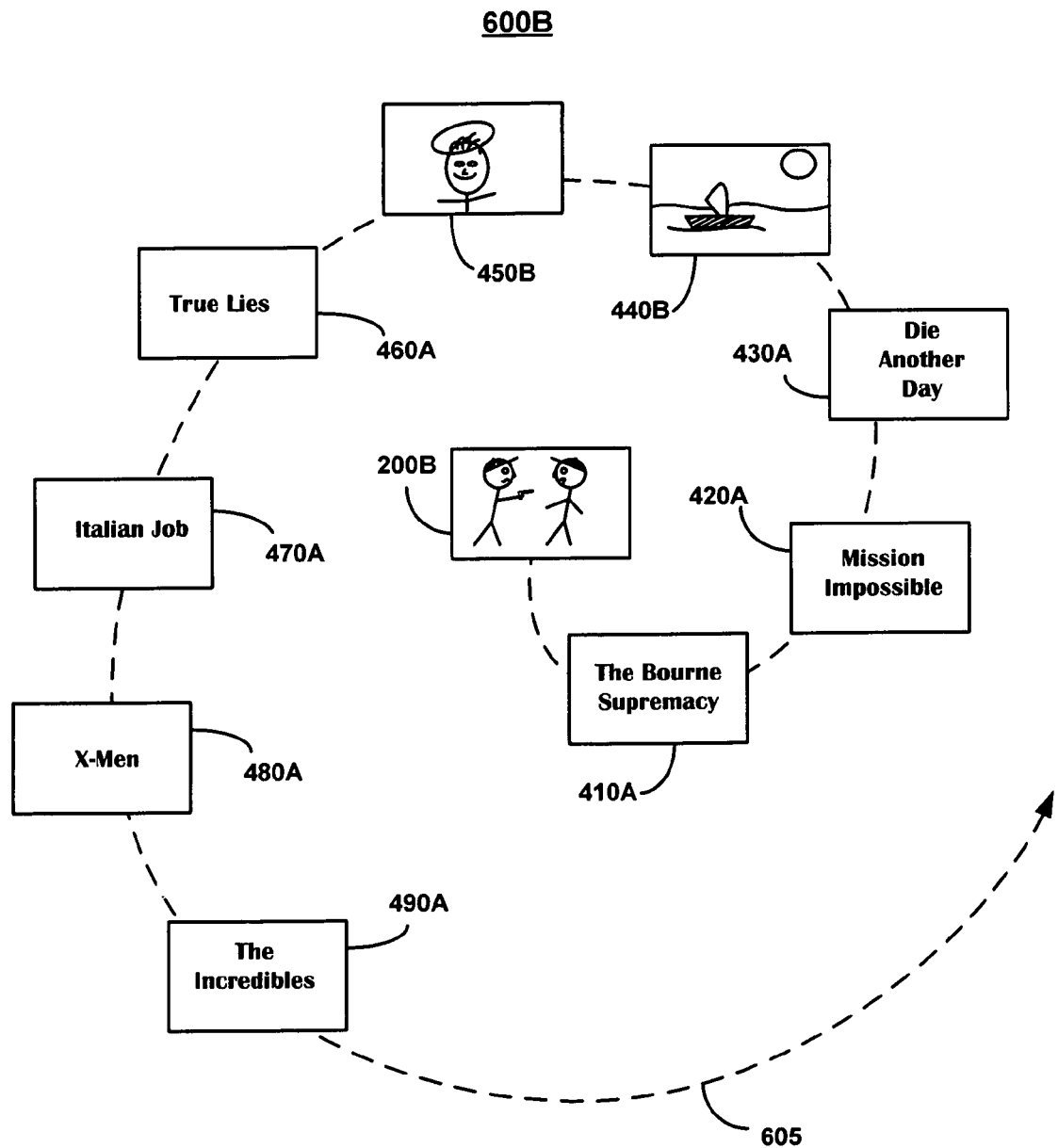
Figure 6C:
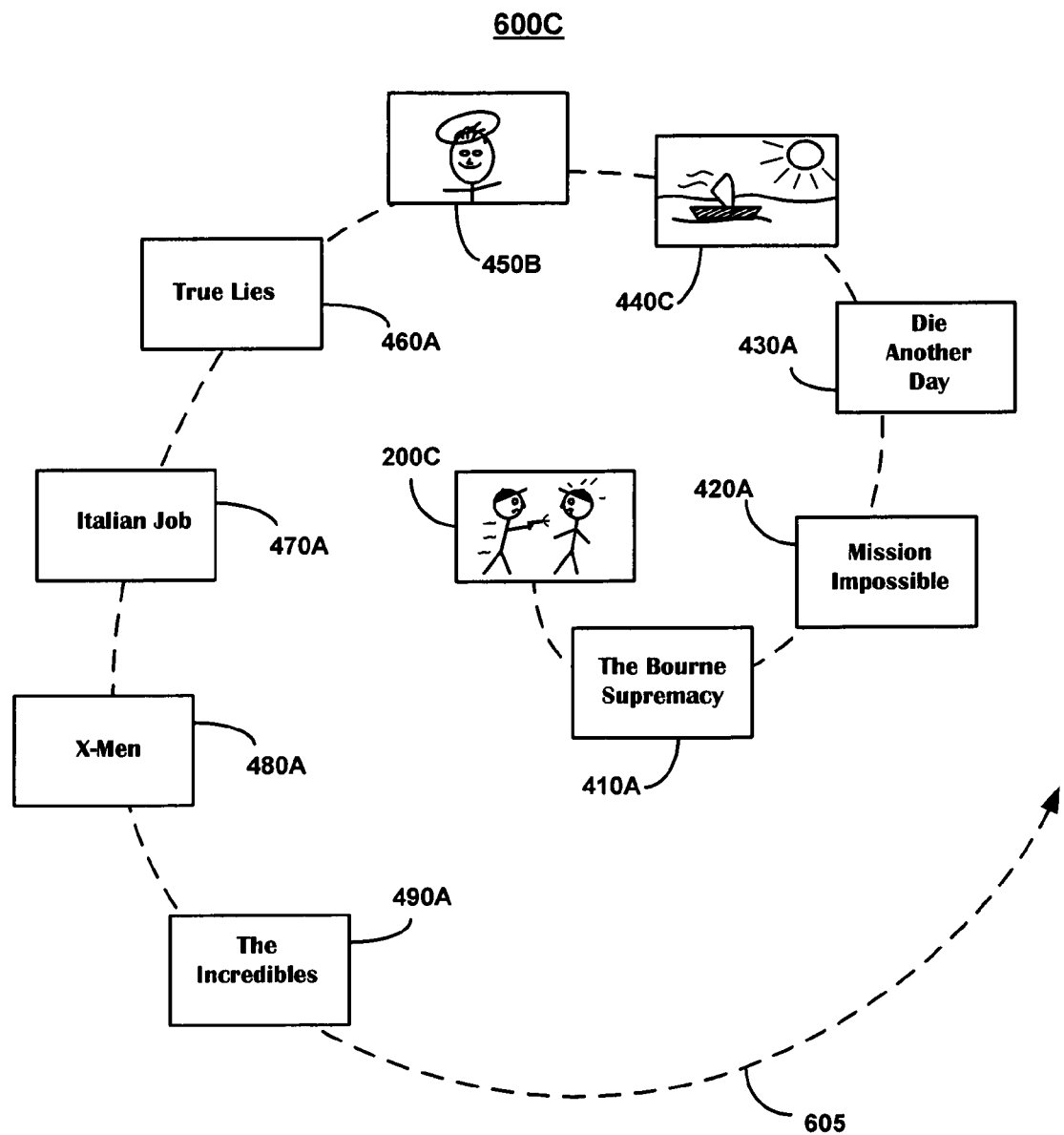

In one embodiment, displaying a spatially oriented relatedness arrangement of selectable media tiles, as described in step 330, comprises displaying the selectable media tiles in a spiral arrangement with the focus media item represented at a center location of the spiral arrangement and a plurality of the related items represented spirally outward from the center location according to a descending order of strength of relationship to the focus media item. FIGS. 6A, 6B, and 6C provide some examples of such a spiral arrangement according to various embodiments of the presented technology. It is appreciated that in FIGS. 6A, 6B, and 6C, like numbered items are the same.

In FIG. 6A focus media item 200 is represented by selectable media tile 200A at the center of spiral arrangement 600A. Spiral arrangement 600A is one example of a linear spiral array. Individual related media items 410, 420, 430, 440, 450, 460, 470, 480, and 490 (collectively related media items 405) are represented by media tiles 410A, 420A, 430A, 440A, 440A, 450A, 460A, 470A, 480A, and 490A, where like numbered media tiles represent like numbered related media items shown in FIGS. 4A and 4B. Related media items 405 are arranged along spiral 605 in descending order of relatedness to focus media item 200 (as shown, for example by rankings 406 in FIG. 4A or relatedness scores 407 in FIG. 4B). Although focus media tile 200A is shown at the distal end of spiral 605 which is located at the center of spiral arrangement 600A, it is appreciated that in other embodiments, that the focus media item may be represented at the opposing distal end of spiral 605, with related media items spiraling inwardly according to a descending order of relatedness to the focus media item.

Thus, by looking at the spatially oriented spiral relatedness arrangement (spiral arrangement 600A) a user can easily discern focus media item 200 (represented by center tile 200A of the physical arrangement) in the center of the arrangement. Likewise, a user can also easily discern relatedness relationships between focus media item 200 and the related media items 405 from the physical locations of the media tiles. For example, a user can discern that media tile 410A is arranged spatially closest to media tile 200A along spiral 605, and therefore media item 410 is most closely related to focus media item 200. Likewise a user can easily discern that media tile 490A is arranged spatially furthest from media tile 200A along spiral 605, and therefore related media item 490 has the lowest level of relationship to focus media item 200.

As shown by FIG. 6A, in one embodiment, displaying a spatially oriented relatedness arrangement (spiral arrangement 600A), as described in step 330, comprises displaying textual information in a selectable media tile of the spatially oriented relatedness arrangement, wherein the textual information is associated with a media item represented by the media tile. In FIG. 6A, for example media tile 200A displays textual information in the form of a movie title, "The Bourne Identity", which is associated with media item 200. In other embodiments, such textual information may comprise the name of an entertainer, or some other textual information associated with the media item.

As shown by FIG. 6B, in one embodiment, displaying a spatially oriented relatedness arrangement (spiral arrangement 600B), as described in step 330, comprises displaying a still image in a selectable media tile of the spatially oriented relatedness arrangement, wherein the still image is associated with a media item represented by the media tile. In FIG. 6B, for example media tile 200B displays a still image which is associated with media item 200. Likewise media tile 440B displays a still image associated with related media item 440 and media tile 450B displays a still image associated with related media item 450. In various embodiments, such still images may comprise an image from a movie, a video, a television show, a package cover, an advertisement, or of an entertainer, or some other entity associated with the media item.

As shown by FIG. 6C, in one embodiment, displaying a spatially oriented relatedness arrangement (spiral arrangement 600C), as described in step 330, comprises displaying a moving image in a selectable media tile of the spatially oriented relatedness arrangement, wherein the moving image is associated with a media item represented by the media tile. In FIG. 6C, for example media tile 200C displays a moving image which is associated with media item 200. Likewise media tile 440C displays a moving image associated with related media item 440. In various embodiments, such moving images may comprise images or clips from a movie, a video, a television show, an advertisement, or of an entertainer, or some other entity associated with the media item. FIGS. 6B and 6C show an example of a mixture of media tile types being displayed simultaneously. For example, in FIG. 6C, media tile 200C displays a moving image, media tile 410A displays textual information, and media tile 450B displays a still image. It is appreciated that other combinations are possible. For instance, all of the presented media tiles may display still images, all of the presented media tiles may present moving images, or all of the presented media tiles may present a mixture of video images and still images.

Figure 7:
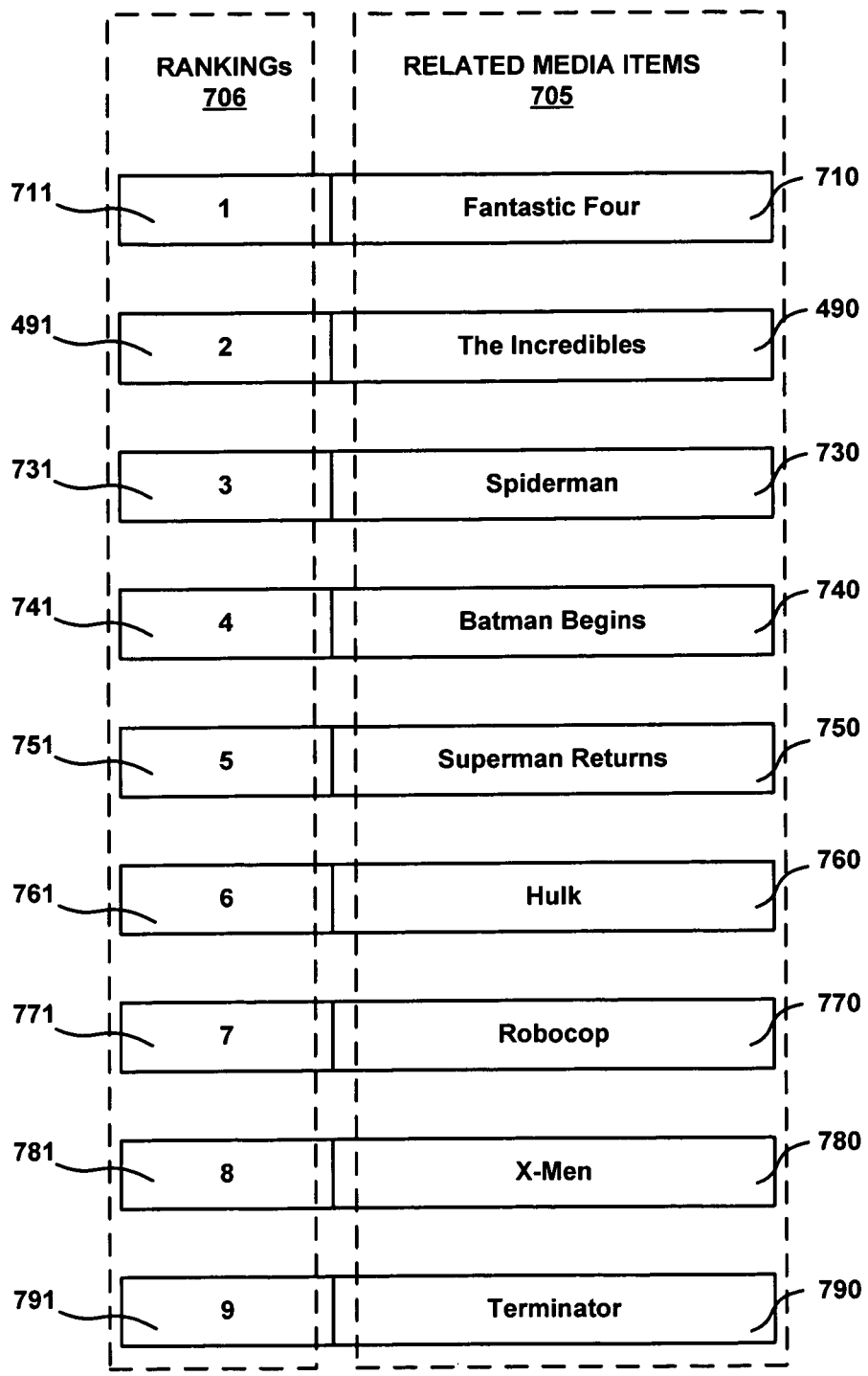
FIG. 7 is another example of related media items and relatedness information pertaining to the related media items, according to an embodiment of the present technology.

In one embodiment of method 300, in response to a user selection of a selectable media tile which represents a related media item of the plurality of related media items, a new spatially oriented relatedness arrangement is displayed where the selected related media item is utilized as a new focus media item. Referring again to the example spiral arrangement 600A shown in FIG. 6A, in one embodiment, a user utilizes a selection device, such as cursor control device 116, to manipulate cursor 610 to select media tile 480A. In response to selection of media tile 480A, related media item 480 of FIGS. 4A and 4B is utilized by a recommendation engine or some other source as a new focus media item As shown in FIG. 7, in one embodiment, a second list of related media items 705 which is related to media item 480 is received. This second list may be received from a recommendation engine or some other source. In one embodiment, a recommendation engine or other source also supplies relatedness information, such as relatedness rankings 706 which indicate hierarchical rankings of related media items 705 in comparison to media item 480. Thus in FIG. 7, related media item 710 has a ranking 711 of "1", indicating that the movie "Fantastic Four" has been ranked as being most related to new focus media item 480, which is the movie "X-Men". In descending order of relatedness, FIG. 7 shows that: related media item 710 has a ranking of 711; related media item 490 has a ranking 491; related media item 730 has a ranking 731; related media item 740 has a ranking 741; related media item 750 has a ranking 751; related media item 760 has a ranking 761; related media item 770 has a ranking 771; related media item 780 has a ranking 781; and related media item 790 has a ranking 791. In one embodiment, these related media items 705 are received in hierarchical order according to relatedness rakings 706. In another embodiment, related media items 705 are received in some random order and are arranged in a linear array or list by hierarchical relatedness ranking 706, as shown in FIG. 7.

Figure 8:
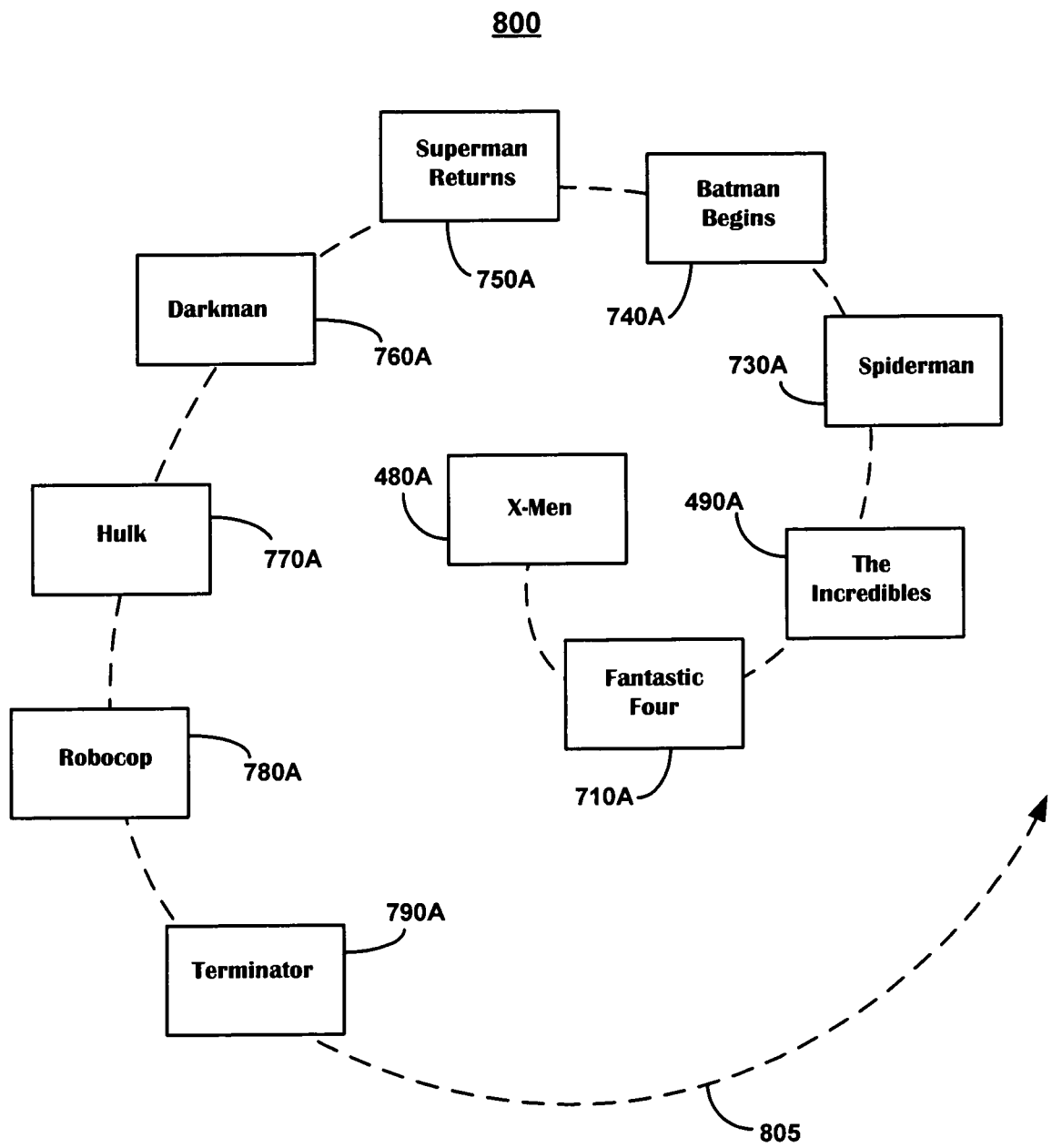
FIG. 8 is an example of a spiral arrangement revised to show a new focus media item surrounded by a second set of related media items, according to an embodiment of the present technology.

FIG. 8 is an example of a spiral arrangement 800 revised to show a new focus media item 480 surrounded by a second set of related media items (710, 490, 730, 740, 750, 760, 770, 780, and 790), according to an embodiment of the present technology. FIG. 8 is similar to FIG. 6A except that new focus media item 480 is represented in the center of spiral arrangement 800 by media tile 480A. Individual related media items 710, 490, 730, 740, 750, 760, 770, 780, and 790 (collectively related, media items 705) are represented by media tiles 710A, 490A, 730A, 740A, 740A, 750A, 760A, 770A, 780A, and 790A, where like numbered media tiles represent like numbered related media items shown in FIG. 7. Related media items 705 are arranged along spiral 805 in descending order of relatedness to focus media item 480 (as shown, for example by rankings 706 in FIG. 7).

Thus, by looking at spatially oriented spiral relatedness arrangement 800 a user can easily discern new focus media item 480 (represented by center tile 480A of the physical arrangement) in the center of the arrangement. Likewise, a user can also easily discern relatedness relationships between new focus media item 480 and the related media items 705 from the physical locations of the media tiles. For example, a user can discern that media tile 710A is arranged spatially closest to media tile 200A along spiral 805, and that therefore media item 710 is most closely related to new focus media item 480. Likewise a user can easily discern that media tile 790A is arranged spatially furthest from media tile 480A along spiral 805, and that therefore related media item 490 has the lowest level of relationship to new focus media item 480.

It is appreciated that embodiments of the present technology are not limited to displaying relatedness of media items via the spiral arrangements shown in FIGS. 6A, 6B, 6C, and FIG. 8.

Figure 9:
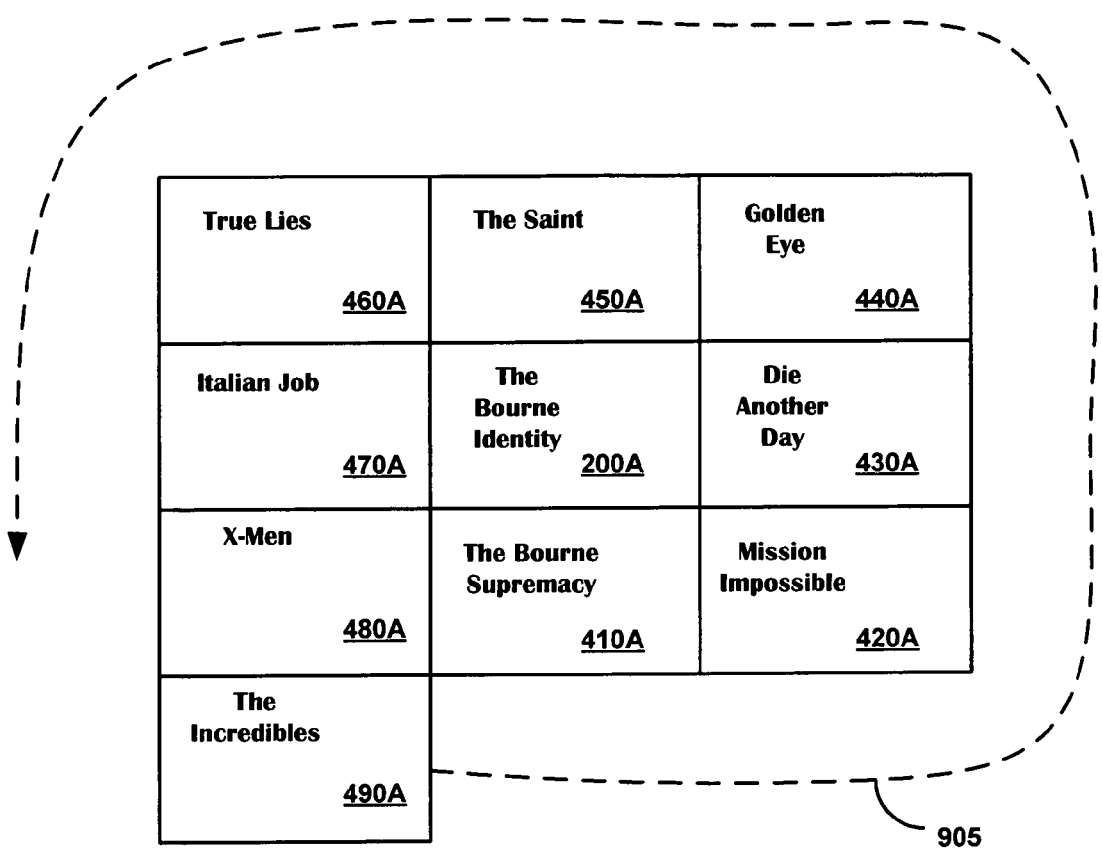
FIG. 9 is another example of a spiral arrangement of a focus media item surrounded by related media items, according to an embodiment of the present technology.

For example, FIG. 9 is another example of a spiral arrangement 900 of a focus media item 200 surrounded by related media 410, 420, 430, 440, 450, 460, 470, 480, and 490, according to an embodiment of the present technology. As shown in FIG. 9, like numbered media tiles represent focus media item 200 and related media items 410, 420, 430, 440, 450, 460, 470, 480, and 490. The hierarchical arrangement of spiral arrangement 900 is the same as shown in spiral arrangement 600A of FIG. 6A, except that the spiral 905 is tighter than spiral 605 and forms a more compact linear spiral array than spiral 605. The tighter spiral causes media tiles 200A, 410A, 420A, 430A, 440A, 450A, 460A, 470A, 480A, and 490A to touch one another. It is appreciated that in this embodiment, as in other embodiments shown discussed herein, a lesser or greater number of media may be represented.

Figure 10:
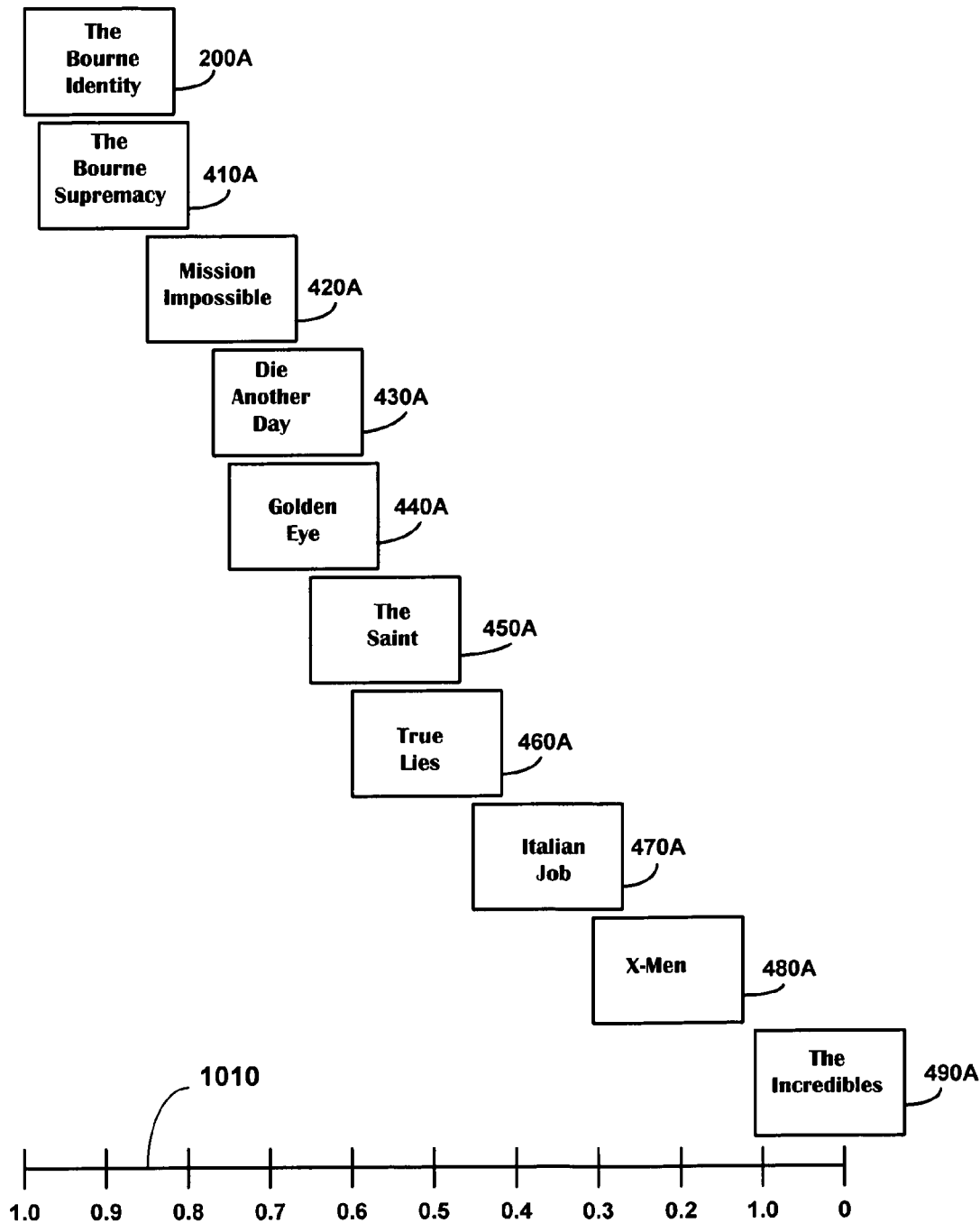
FIG. 10 is an example of an arrangement of a focus media item with related media items physically arranged according to relatedness to the focus media item, according to one embodiment of the present technology.

FIG. 10 is an example of an arrangement of a focus media item 200 with related media items 410, 420, 430, 440, 450, 460, 470, 480, and 490 physically arranged according to relatedness to focus media item 200, according to one embodiment of the present technology. As shown in FIG. 10, like numbered media tiles represent focus media item 200 and related media items 410, 420, 430, 440, 450, 460, 470, 480, and 490. In the hierarchical arrangement of FIG. 10 related media tiles 410A, 420A, 430A, 440A, 450A, 460A, 470A, 480A, and 490A are disposed vertically below focus media tile 200A according to the relatedness rankings 406 shown in FIG. 4A.

Additionally, FIG. 10 demonstrates the use of relatedness scores 407 of FIG. 4B to physically position related media tiles 410A, 420A, 430A, 440A, 450A, 460A, 470A, 480A, and 490A with horizontal displacements rightward according to their individual relatedness scores. Scale 1010 is supplied for illustrative purposes, and shows that, the bottom left corner of media tile 200A is positioned at a value of 1.0 with respect to scale 1010. The bottom left corner of media tile 410A is positioned at a value of 0.97 with respect to scale 1010 according to its relatedness score 412 of "0.97". Similarly the bottom left corner of media tile 420A at "0.85 with respect to scale 1010 according to its relatedness score 422 of "0.85". The remainder of the media tiles of FIG. 10 are positioned at scaled horizontal locations according to their respective relatedness scores 407. It is appreciated that, in one embodiment, such a scaled dispersal of media tiles or other representations of media items may also be applied to a linear spiral array, such as spiral arrangement 600A. It is also appreciated that such a scaled dispersal may be applied to other two-dimensional and even one-dimensional (such as along a line) representations of media items.

Providing and Selecting from a Display of Media Items on a Display Device

FIG. 11 is a flow diagram 1100 of operations performed in accordance with one embodiment of the present technology for displaying relatedness of media items. More specifically, FIG. 11 illustrates a flow diagram 1100 of an example method of providing and selecting from an arrangement of media items on a display device. The method is performed in a computer system 100 having a graphical user interface including a display device 118. Elements of flow diagram 1100 are explained below, with reference to elements of FIG. 2, FIG. 4A, FIG. 4B, FIG. 5, FIG. 6A, FIG. 6B, FIG. 6C, FIG. 7, FIG. 8, FIG. 9, and FIG. 10, and reference to steps of flow diagram 300 of FIG. 3.

At step 1110 of flow diagram 1100, the method receives a plurality of media tiles representing a focus media item and a plurality of related media items related to the focus media item. Step 1110 is performed consistent with the description of step 310 of flow diagram 300, except that the media items are received in the form of media tiles. A recommendation engine (previously described herein), is one source which may supply media items in the form of media tiles.

In one embodiment a media tile is received that comprises a still image of a media item represented by the media tile. Media tile 200B of FIG. 5 shows one example of a media tile which comprises a still image associated with a media item (focus media item 200 in this instance). In one embodiment a media tile is received that comprises a moving image of a media item represented by the media tile. Media tile 200C of FIG. 5 shows one example of a media tile which comprises a moving image, such as a video clip, associated with a media item (focus media item 200 in this instance). In one embodiment a media tile is received that comprises a textual description of a media item represented by the media tile. Media tile 200A of FIG. 5 shows one example of a media tile which comprises a textual description, such as a title, associated with a media item (focus media item 200 in this instance). In one embodiment, a mixture of these different types of media tiles is received.

At step 1120 of flow diagram 1100, the method receives relatedness information pertaining to at least one of the plurality of related media items. Step 1120 is performed consistent with the description of step 320 of flow diagram 300. This can comprise receiving strength of relatedness information useable to hierarchically arrange relatedness of the related media items to the focus media items. FIG. 4A provides an example of strength relatedness information for related media items 405 being provided in the form of relatedness rankings 406. FIG. 4B provides an example of strength relatedness information for related media items 405 being provided in the form of relatedness score 407. It is appreciated that strength of relatedness information may be received in additional formats, such as, for example of other types of relatedness metadata included with one or more of related media items.

At step 1130 of flow diagram 1100, the method utilizes the relatedness information for physically positioning the plurality of media tiles on display device 118 such that the physical positioning of the media tiles provides a representation of relatedness between the focus media item and at least one of the plurality of related media items. Step 1130 is similar to step 330 of flow diagram 300. In one embodiment, this comprises utilizing the relatedness information for physically positioning the plurality of media tiles on display device 118 in a two-dimensional arrangement. Media tiles that are physically positioned may be all of the same type (such as all text media tiles, all still image media tiles, or all moving image media tiles) or a mixture of different types of media tiles.

FIGS. 6A, 6B, and 6B, provide some examples of two-dimensional physical positioning of media tiles in spiral arrangements (600A, 600B, and 600C) which provide representations of relatedness between a focus media item and one or more related media items. The relatedness is shown by physically positioning tiles representing related media items 405 in a descending hierarchical order of relatedness ranking spiraling outward on spiral 605 from focus media item 200 which is represented at the center of spiral arrangements 600A, 600B, and 600C. FIG. 9 and FIG. 10 show other examples of media tiles being two-dimensionally physically positioned to provide representations of relatedness between a focus media item and one or more related media items. It is appreciated that FIGS. 6A, 6B, 6C, 9, and 10 are shown by way of example, and not of limitation, and that via the teachings of the presented technology, media tiles may be physically positioned in other two-dimensional arrangements utilizing relatedness information.

At step 1140 of flow diagram 1100, the method receives a selection signal indicative of a user selecting a media item associated with a media tile displayed on display device 118. In response to the selection signal, the method revises the physical positioning on display device 118 to provide a representation of relatedness between the selected media item and a second plurality of related media items related to said selected media item. With reference to FIG. 6A, selectable media tile 480A is shown being selected with cursor 610 through the use of a selection device, such as cursor control device 116. In response to a selection signal from cursor control device 116, a revised physical positioning (spiral arrangement 800 of FIG. 8) is displayed on display device 118. Media item 480 (represented by media tile 480A) is shown at the center of spiral arrangement 800 and is surrounded by related media tiles at physical positionings which represent relatedness between media item 480 and a second plurality of related media items 705 (FIG. 7).

Displaying Media Item Relationships

FIG. 12 is a flow diagram 1200 of operations performed in accordance with one embodiment of the present technology for displaying relatedness of media items. More specifically, FIG. 12 illustrates a flow diagram 1200 of a method of displaying media item relationships. In one embodiment, method 1200 may be implemented as instructions on a computer-useable medium executable by a computer such as computer 100. Elements of flow diagram 1200 are explained below, with reference to elements of FIG. 2, FIG. 4A, FIG.

4B, FIG. 5, FIG. 6A, FIG. 6B, FIG. 6C, FIG. 7, FIG. 8, FIG. 9, and FIG. 10, and reference to steps of flow diagram 300 of FIG. 3.

At step 1210 of flow diagram 1200, the method receives a focus media item and a plurality of related media items, the plurality of related media items being related to the focus media item. Step 1210 is performed consistent with the description of step 310 of flow diagram 300. In the interests of brevity and clarity this description will not be repeated herein.

At step 1220 of flow diagram 1200, the method receives relatedness information pertaining to at least one of the plurality of related media items. Step 1220 is performed consistent with the description of step 320 of flow diagram 300. In the interests of brevity and clarity this description will not be repeated herein.

At step 1230 of flow diagram 1200, the method displays the focus media item and at least one of the related media items on a display device 118 such that a physical positioning of the focus media item relative to the at least one related media item provides a representation of the relatedness information. Step 1230 is similar to step 330 of flow diagram 300 described previously herein, except that in step 1230 raw content of a media item, such as textual content, a still image, or a moving image may be displayed, positioned, and scaled (if necessary) independently of being displayed within the confines of a media tile. This will result in a display which, for all intents and purposes, looks similar to the example arrangements of media tiles shown herein, except that the construct of a media tile need not be utilized.

Consistent with the previously discussed displays of media tiles (200A, 200B, and 200C for example), displaying a media item may comprise displaying a still image, wherein the still image is representative of a media item of the plurality of media items. Likewise, displaying a media item may comprise displaying a moving image, wherein the moving image is representative of a media item of said plurality of media items. Additionally, displaying a media item may comprise displaying textual information, wherein the textual information is representative of a media item of the plurality of media items. In one embodiment, this may comprise displaying raw content of a homogeneous type, such as all textual information, all still images, or all moving images. In other embodiments, this comprises displaying raw content of mixed types such as a combination of textual information, still image(s), and/or moving image(s). The focus media item and one or more of the related media items may be displayed as the same type of content (homogeneous content), or as different types of content.

In one embodiment, displaying the focus media item and at least one of the related media items on a display device 118 comprises utilizing the relatedness information for physically positioning the focus media item and a plurality of the related media items on display device 118 in an arrangement in which the physical positioning spatially displays a hierarchy of relatedness. In one embodiment, such a display of media items on display device 118 may be physically structured similarly to the spiral linear arrays shown in FIGS. 6A, 6B, 6C, 8 or 9. In another embodiment, such a display of media items may take another two dimensional form, for instance, as shown and described in conjunction with FIG. 10.

In one embodiment, step 1230 further comprises displaying a new representation of relatedness between a user selected media item and a second plurality of related media items related to the user selected media item. In such an embodiment, the user selected media item is selected from the plurality of related media items (e.g., the focus media item or one of the related media items). This is similar to the previously described example of spiral display 800 being displayed in response to media tile 480A of FIG. 6A being selected with cursor 610. In this case however, a selection device is used to directly select a displayed media item rather than a media tile representing the media item. In response to the selection, the selected media item becomes the focus media item and a second plurality of related media items is displayed in a manner, as disclosed herein, which physically represents relatedness between the new focus media item and one or more of the second plurality of related media items displayed in conjunction with the new focus media item. In an instance where the focus media item is selected, a second plurality of related media items related to the focus media item (perhaps more distantly related or related in some other manner) is received and displayed in conjunction with the focus media item in the manner described herein.

Example embodiments of the present technology for displaying relatedness of media items are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying relatedness of media items on a display device of a computer system of a user, said method comprising:

providing a focus media item to a recommendation engine as input;

receiving, from said recommendation engine at said computer system, a first plurality of related media items to be displayed by said display device, said first plurality of related media items being related to said focus media item, wherein:

individual related media items of said first plurality of related media items include graphical information for displaying said individual related media items of said first plurality of related media items as selectable media tiles;

receiving, from said recommendation engine at said computer system, first relatedness metadata for said first plurality of related media items, wherein:

said first relatedness metadata includes relatedness scores of said individual related media items of said first plurality of related media items that identify relationship strengths to said focus media item;

displaying, on said display device, a first spatially oriented relatedness arrangement of selectable media tiles physically positioned to indicate relationship strength of said focus media item to each individual related media item of said first plurality of related media items, said selectable media tiles representing said focus media item and said individual related media items of said first plurality of related media items, said first spatially oriented relatedness arrangement comprising a two-dimensional arrangement of selectable media tiles, wherein:

selectable media tiles representing said individual related media item of said first plurality of related media items are physically positioned relative to a selectable media tile representing said focus media item utilizing said relatedness scores of said individual related media items of said first plurality of related media items;

receiving, at said computer system, a selection by said user of either said selectable media tile representing said focus media item or a selectable media tile representing a particular individual related media item of said first plurality of related media items; and displaying a second spatially oriented relatedness arrangement of selectable media tiles utilizing a second plurality of related media items and second relatedness metadata for said second plurality of related media items received from said recommendation engine based on said selection, wherein:

individual related media items of said second plurality of related media items include graphical information for displaying said individual related media items of said second plurality of related media items as selectable media tiles, said second relatedness metadata includes relatedness scores of said individual related media item of said second plurality of related media items, if said selectable media tile representing said focus media item is selected from said first spatially oriented relatedness arrangement:

said second plurality of related media items is a collection of media items more distantly related to said focus media item than said first plurality of media items, and selectable media tiles representing said individual related media item of said second plurality of related media items are physically positioned relative to said selectable media tile representing said focus media item utilizing said relatedness scores of said individual related media items of said second plurality of related media items, and if said selectable media tile representing said particular individual related media item of said first plurality of media items is selected from said first spatially oriented relatedness arrangement:

said second plurality of related media items is a collection of media items related to said particular individual related media item of said first plurality of related media items, and selectable media tiles representing said individual related media item of said second plurality of related media items are physically positioned relative to said selectable media tile representing said particular individual related media item of said first plurality of related media items utilizing said relatedness scores of said individual related media items of said second plurality of related media items.

2. The method as recited in claim 1, further comprising:
receiving selection of said selectable media tile representing said particular individual related media item of said first plurality of media items; and
providing said particular individual related media item of said first plurality of media items to said recommendation engine as a new focus media item.

3. The method as recited in claim 1, wherein:
said individual related media items of said first plurality of related media items are received at said computer system in random order from said recommendation engine, and
said individual related media items of said first plurality of related media items related are arranged by said computer system in hierarchical order according to said relatedness scores of said individual related media items of said first plurality of related media items.

4. The method as recited in claim 1, wherein each relatedness score is a value less than 1.

5. The method as recited in claim 1, wherein said first spatially oriented relatedness arrangement of selectable media tiles comprises:
a spiral arrangement with said selectable media tile representing said focus media item at a center location of said spiral arrangement and surrounded by said selectable media tiles representing said first plurality of related items arranged according to descending order of strength of relationship to said focus media item.

6. The method as recited in claim 1, wherein said first spatially oriented relatedness arrangement of selectable media tiles comprises:
still images representing said focus media item and said first plurality of related media items.

7. The method as recited in claim 1, wherein said first spatially oriented relatedness arrangement of selectable media tiles comprises:
moving images representing said focus media item and said first plurality of related media items.

8. The method as recited in claim 1, wherein said first spatially oriented relatedness arrangement of selectable media tiles comprises:
selectable media tiles representing related movies.

9. A computer-readable storage device storing computer-executable instructions that, when executed, cause a computer system of a user to perform a method for displaying relatedness of media items on a display device, said method comprising:

providing a focus media item to a recommendation engine as input;

receiving, from said recommendation engine at said computer system, a first plurality of related media items to be displayed by said display device, said first plurality of related media items being related to said focus media item, wherein:

individual related media items of said first plurality of related media items include graphical information for displaying said individual related media items of said first plurality of related media items as selectable media tiles;

receiving, from said recommendation engine at said computer system, first relatedness metadata for said first plurality of related media items, wherein:

said first relatedness metadata includes relatedness scores of said individual related media items of said first plurality of related media items that identify relationship strengths to said focus media item;

displaying, on said display device, a first spatially oriented relatedness arrangement of selectable media tiles physically positioned to indicate relationship strength of said focus media item to each individual related media item of said first plurality of related media items, said selectable media tiles representing said focus media item and said individual related media items of said first plurality of related media items, said first spatially oriented relatedness arrangement comprising a two-dimensional arrangement of selectable media tiles, wherein:

selectable media tiles representing said individual related media item of said first plurality of related media items are physically positioned relative to a selectable media tile representing said focus media item utilizing said relatedness scores of said individual related media items of said first plurality of related media items;

receiving, at said computer system, a selection by said user of either said selectable media tile representing said focus media item or a selectable media tile representing a particular individual related media item of said first plurality of related media items; and displaying a second spatially oriented relatedness arrangement of selectable media tiles utilizing a second plurality of related media items and second relatedness metadata for said second plurality of related media items received from said recommendation engine based on said selection, wherein:

individual related media items of said second plurality of related media items include graphical information for displaying said individual related media items of said second plurality of related media items as selectable media tiles, said second relatedness metadata includes relatedness scores of said individual related media item of said second plurality of related media items, if said selectable media tile representing said focus media item is selected from said first spatially oriented relatedness arrangement:

said second plurality of related media items is a collection of media items more distantly related to said focus media item than said first plurality of media items, and selectable media tiles representing said individual related media item of said second plurality of related media items are physically positioned relative to said selectable media tile representing said focus media item utilizing said relatedness scores of said individual related media items of said second plurality of related media items, and if said selectable media tile representing said particular individual related media item of said first plurality of media items is selected from said first spatially oriented relatedness arrangement:

said second plurality of related media items is a collection of media items related to said particular individual related media item of said first plurality of related media items, and selectable media tiles representing said individual related media item of said second plurality of related media items are physically positioned relative to said selectable media tile representing said particular individual related media item of said first plurality of related media items utilizing said relatedness scores of said individual related media items of said second plurality of related media items.

10. The computer-readable storage device of claim 9, further storing computer-executable instructions for:

receiving selection of said selectable media tile representing said particular individual related media item of said first plurality of media items; and providing said particular individual related media item of said first plurality of media items to said recommendation engine as a new focus media item.

11. The computer-readable storage device of claim 9, wherein said first spatially oriented relatedness arrangement of selectable media tiles comprises:

a spiral arrangement with said selectable media tile representing said focus media item at a center location of said spiral arrangement and surrounded by said selectable media tiles representing said first plurality of related items arranged according to descending order of strength of relationship to said focus media item.

12. The computer-readable storage device of claim 9, wherein said first spatially oriented relatedness arrangement of selectable media tiles comprises:

still images representing said focus media item and said first plurality of related media items.

13. The computer-readable storage device of claim 9, wherein said first spatially oriented relatedness arrangement of selectable media tiles comprises:

moving images representing said focus media item and said first plurality of related media items.

14. The computer-readable storage device of claim 9, wherein each relatedness score is a value less than 1.

15. A computer system of a user comprising:

a display device;

memory storing computer-executable instructions; and one or more processors for executing said computer-executable instructions stored in said memory to perform a method for displaying relatedness of media items, said method comprising:

providing a focus media item to a recommendation engine as input;

receiving, from said recommendation engine at said computer system, a first plurality of related media items to be displayed by said display device, said first plurality of related media items being related to said focus media item, wherein:

individual related media items of said first plurality of related media items include graphical information for displaying said individual related media items of said first plurality of related media items as selectable media tiles;

receiving, from said recommendation engine at said computer system, first relatedness metadata for said first plurality of related media items, wherein:

said first relatedness metadata includes relatedness scores of said individual related media items of said first plurality of related media items that identify relationship strengths to said focus media item;

displaying, on said display device, a first spatially oriented relatedness arrangement of selectable media tiles physically positioned to indicate relationship strength of said focus media item to each individual related media item of said first plurality of related media items, said selectable media tiles representing said focus media item and said individual related media items of said first plurality of related media items, said first spatially oriented relatedness arrangement comprising a two-dimensional arrangement of selectable media tiles, wherein:

selectable media tiles representing said individual related media item of said first plurality of related media items are physically positioned relative to a selectable media tile representing said focus media item utilizing said relatedness scores of said individual related media items of said first plurality of related media items;

receiving, at said computer system, a selection by said user of either said selectable media tile representing said focus media item or a selectable media tile representing a particular individual related media item of said first plurality of related media items; and displaying a second spatially oriented relatedness arrangement of selectable media tiles utilizing a second plurality of related media items and second relatedness metadata for said second plurality of related media items received from said recommendation engine based on said selection, wherein:

individual related media items of said second plurality of related media items include graphical information for displaying said individual related media items of said second plurality of related media items as selectable media tiles, said second relatedness metadata includes relatedness scores of said individual related media item of said second plurality of related media items, if said selectable media tile representing said focus media item is selected from said first spatially oriented relatedness arrangement:

said second plurality of related media items is a collection of media items more distantly related to said focus media item than said first plurality of media items, and selectable media tiles representing said individual related media item of said second plurality of related media items are physically positioned relative to said selectable media tile representing said focus media item utilizing said relatedness scores of said individual related media items of said second plurality of related media items, and if said selectable media tile representing said particular individual related media item of said first plurality of media items is selected from said first spatially oriented relatedness arrangement:

said second plurality of related media items is a collection of media items related to said particular individual related media item of said first plurality of related media items, and selectable media tiles representing said individual related media item of said second plurality of related media items are physically positioned relative to said selectable media tile representing said particular individual related media item of said first plurality of related media items utilizing said relatedness scores of said individual related media items of said second plurality of related media items.

16. The computer system as recited in claim 15, said memory storing computer-executable instructions for:

receiving selection of said selectable media tile representing said particular individual related media item of said first plurality of media items; and providing said particular individual related media item of said first plurality of media items to said recommendation engine as a new focus media item.

17. The computer system as recited in claim 15, wherein each relatedness score is a value less than 1.

18. The computer system as recited in claim 15, wherein said first spatially oriented relatedness arrangement of selectable media tiles comprises:

a spiral arrangement with said selectable media tile representing said focus media item at a center location of said spiral arrangement and surrounded by said selectable media tiles representing said first plurality of related items arranged according to descending order of strength of relationship to said focus media item.

19. The computer system as recited in claim 15, wherein said first spatially oriented relatedness arrangement of selectable media tiles comprises:

still images representing said focus media item and said first plurality of related media items.

20. The computer system as recited in claim 15, wherein said first spatially oriented relatedness arrangement of selectable media tiles comprises:

moving images representing said focus media item and said first plurality of related media items.

* * * * *